UNITED STATES PATENT OFFICE.

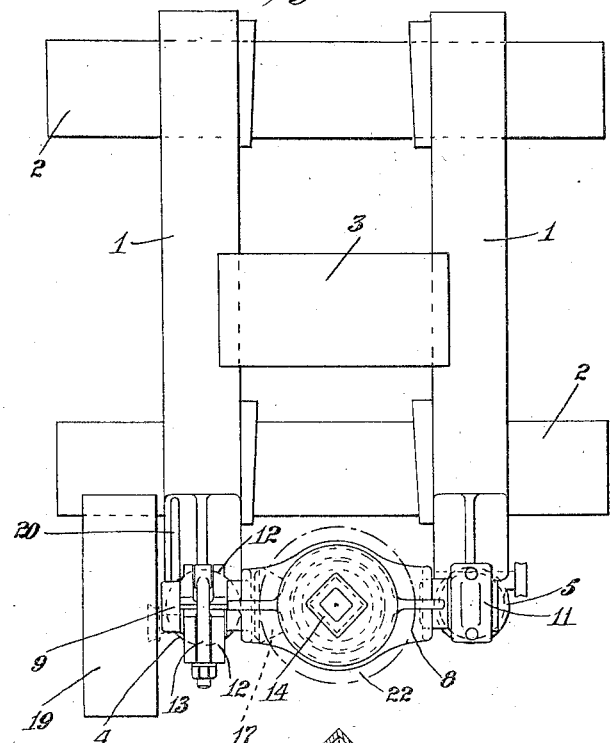
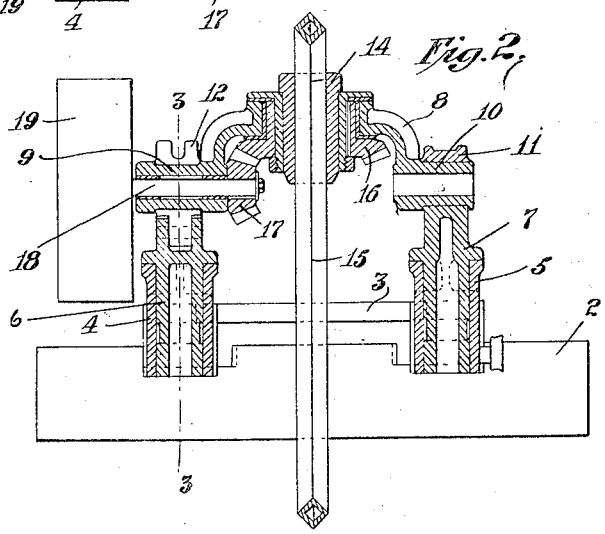

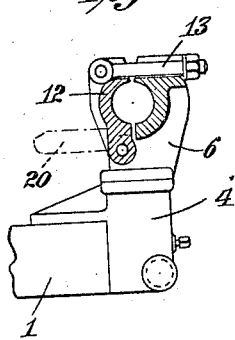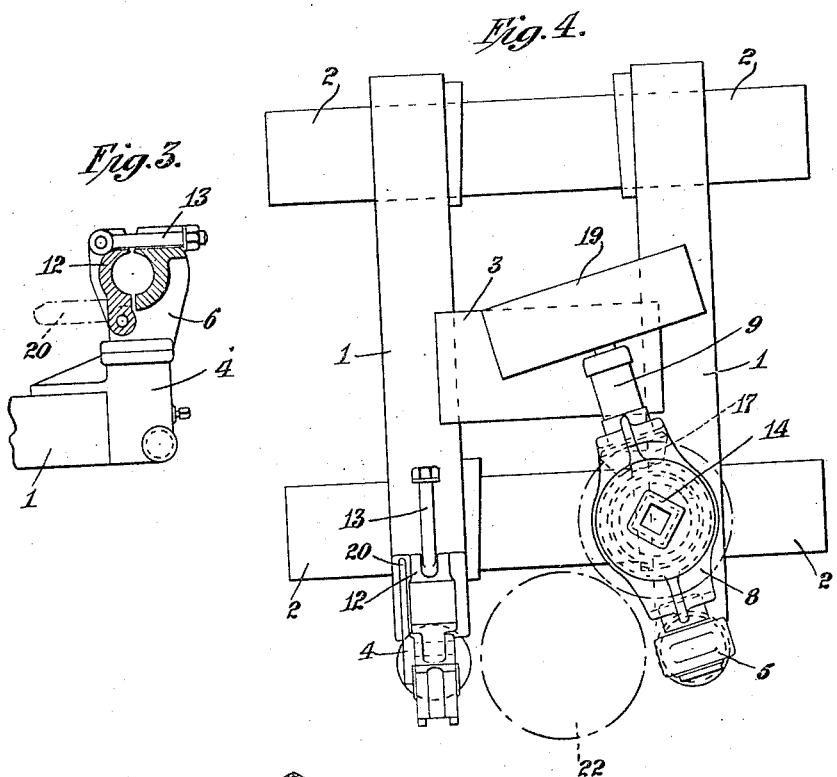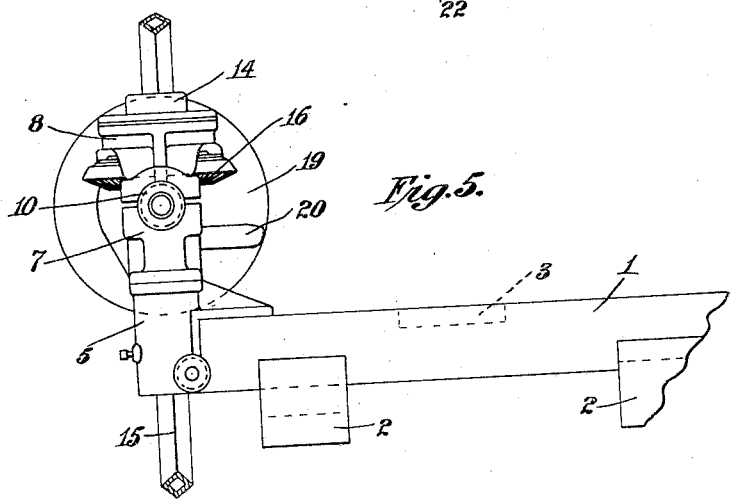

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CORE-DRILL.

1,358,441.

Specification of Letters Patent. Patented Nov. 9, 1920.

Application filed July 24, 1919. Serial No. 312,989.

*To all whom it may concern:*

Be it known that I, CHARLES C. HANSEN, a citizen of the United States, residing at Easton, in the county of Northampton and State of Pennsylvania, have invented a certain new and useful Improvement in Core-Drills, of which the following is a specification.

This invention relates to an improvement in drills of the type known as "core drills," which are arranged to extract cores from the material being operated upon, and particularly has to do with certain improvements simplifying and facilitating the general setting up and disassembling of such machines, as well as simplifying the operation of withdrawing the drill rods and removing the core.

In prior constructions of this kind the drill head which supports and rotates the drill spindle and drill rods has been mounted on the frame of the machine in such a manner that when a new length of drill rod was required to be added or when the core was to be removed, the entire drill frame had to be moved away from the work to permit access to the drill rods and core, and afterward replaced, with consequent disturbance to the adjustment as well as loss of time.

The object of the present invention is to facilitate the operation of core drills generally by providing means whereby, when access to the core or drill rods is desired, the drill head may be quickly moved out of alinement with the hole being drilled and as quickly replaced without disturbing the adjustment of the drilling outfit.

A further object of the invention is to provide a drill head which may be dismantled quickly into relatively small light parts which may be readily transported.

These objects are accomplished by the construction illustrated in the accompanying drawings and described in the following specification, in which—

Figure 1 is a plan view of the device showing the drill head in position for operation;

Fig. 2, a vertical section through the drill head, showing the parts in detail;

Fig. 3, a detail view through the clamping means at one side of the machine, taken on the line 3—3 of Fig. 2;

Fig. 4, a plan view showing the drill in the position assumed when the core is being removed; and Fig. 5, a side elevation of the drill.

As shown, the core drilling outfit comprises timbers 1 and 2 forming part of the main frame, which may be mounted on a wagon or supported in any desired manner (not shown). Resting upon and between these timbers 1 and 2 and forming a sort of flooring is a board 3, the purpose of which will later appear. The timbers 1 and 2 project forwardly to a distance sufficient to place the ends thereof in alinement with the spot where the drilling operation is to take place and bolted or otherwise secured to these ends are brackets 4 and 5, respectively. Rotatably mounted in the brackets 4 and 5 in a well known manner, are pivotal stands 6 and 7 respectively, arranged to slide vertically in the brackets. The drill head 8 is supported on trunnions 9 and 10 seated in suitable bearings on the pivotal stands 6 and 7, the trunnion 10 being clamped on to the stand 7 by means of a cap 11 and the trunnion 9 secured in the pivotal stand 6 by means of a swinging clamp 12 and swinging bolt 13, as shown in Fig. 3. It will thus be seen that the drill head is rotatable in a vertical plane and arranged to be secured in position for drilling at any desired angle by tightening the cap 11 and clamp 12. The drill head 8, furthermore, comprises a squared bushing 14 in which is secured the hollow drill spindle 15, also square in cross section and sliding within the square bushing 14. Operation of the drill spindle 15 is effected by intermeshing engagement between a bevel gear 16 on the under side of the drill head 8 and bevel gear 17 secured on the end of a shaft 18 passing through the trunnion 9, this shaft carrying on its outer end a pulley 19. The pulley 19 is, in turn, driven by belt or other connection with any desired source of motive power (not shown). The general set-up of the apparatus is also facilitated by the use of the clamp 12, for the belt connecting the pulley 19 with the source of motive power is loosely slipped on to the pulley 19 just as the trunnion 9 reaches its seat in the stand 6 and the tightening of the swinging clamp to secure the drill head brings the belt to the proper tight working adjustment. Outstanding horizontally from the pivotal stand 6 and in alinement with the trunnions 9 and 10 is a rib 20.

When, during the course of the drilling operation it is desired to change drill spindles or to have a clear working space around the hole for any purpose, the bolt 13 is loosened, allowing the swinging clamp 12 to fall. The drill head is now in position to rotate on the pivotal stand 7 in a horizontal plane. As the drill head is swung away the trunnion 9 slides on the rib 20 and over the sloping end thereof until the pulley 19 rests upon the timber 1, which thus supports the weight of the drill head. Further rotation of the drill head causes the pulley 19 to travel in an arcuate path over the timber 1 and flooring 3 until at the limit of its movement it will be entirely away from the working field represented by the circle 22, thus permitting ready access thereto, as shown in Fig. 4. The drill is returned to its original position in the same manner, without any deviation in alinement or disturbance of parts having taken place.

From the construction above described it will be seen that a drill has been devised which may be readily assembled or disassembled into parts of small weight. The timbers, which are held in position by wedges, may be entirely separated from each other by driving out the wedges and the drill head 8 may be readily separated from the brackets 6 and 7. At the same time a construction has been devised which will permit the drill tools being removed with a minimum of time and dislocation of parts. Furthermore, the parts may be readily returned to operative position and brought back accurately to their original position most expeditiously.

It is to be understood that while in the present showing and description there is disclosed but one specific embodiment of the present invention, other forms and modifications are included within the spirit and scope of the invention, as expressed in the appended claims.

What I claim is:

1. In an apparatus of the character described, a supporting frame, a drill head trunnioned on supports pivotally secured to said supporting frame, and means arranged to release one end of the drill head to permit movement of the drill head out of the working plane independently of the supporting frame.

2. In an apparatus of the character described, a supporting frame, a drill head trunnioned on supports pivotally secured to said supporting frame and swinging clamping means arranged to release one end of the drill head to permit movement of the drill head out of the working plane independently of the supporting frame.

3. In an apparatus of the character described, a supporting frame, a drill head trunnioned on supports pivotally secured to said supporting frame, means arranged to release one end of the drill head and means for supporting the weight of the drill head as it is swung out of the working plane independently of the supporting frame.

4. In an apparatus of the character described, a supporting frame, a drill head trunnioned on vertically slidable stands pivotally secured to said supporting frame, motive power transmission mechanism for said drill head connected thereto, clamping means arranged to release one end of the drill head, a rib outstanding from one of said stands for supporting the weight of the drill head as it is swung away from said stand and means forming an arcuate path on the supporting frame for carrying the free end of the drill head as it leaves said rib and swings out of the working plane.

5. In an apparatus of the character described, a supporting frame, a drill head trunnioned on stands secured to said supporting frame, motive power transmission mechanism for said drill head connected thereto, clamping means arranged to release one end of the drill head, a rib outstanding from one of said stands for supporting the weight of the drill head as it is swung away from said stand and means forming a path on the supporting frame for carrying the free end of the drill head as it leaves said rib and swings out of the working plane.

In testimony whereof I have hereunto set my hand.

CHARLES C. HANSEN.